Jan. 3, 1956 F. G. ROHM 2,729,201
CYLINDER BAFFLE FOR AIR-COOLED ENGINE
Filed Oct. 28, 1954 4 Sheets-Sheet 1

INVENTOR.
FREDRIC G. ROHM.
BY Alden D. Redfield
Warren Kunz.
ATTORNEYS.

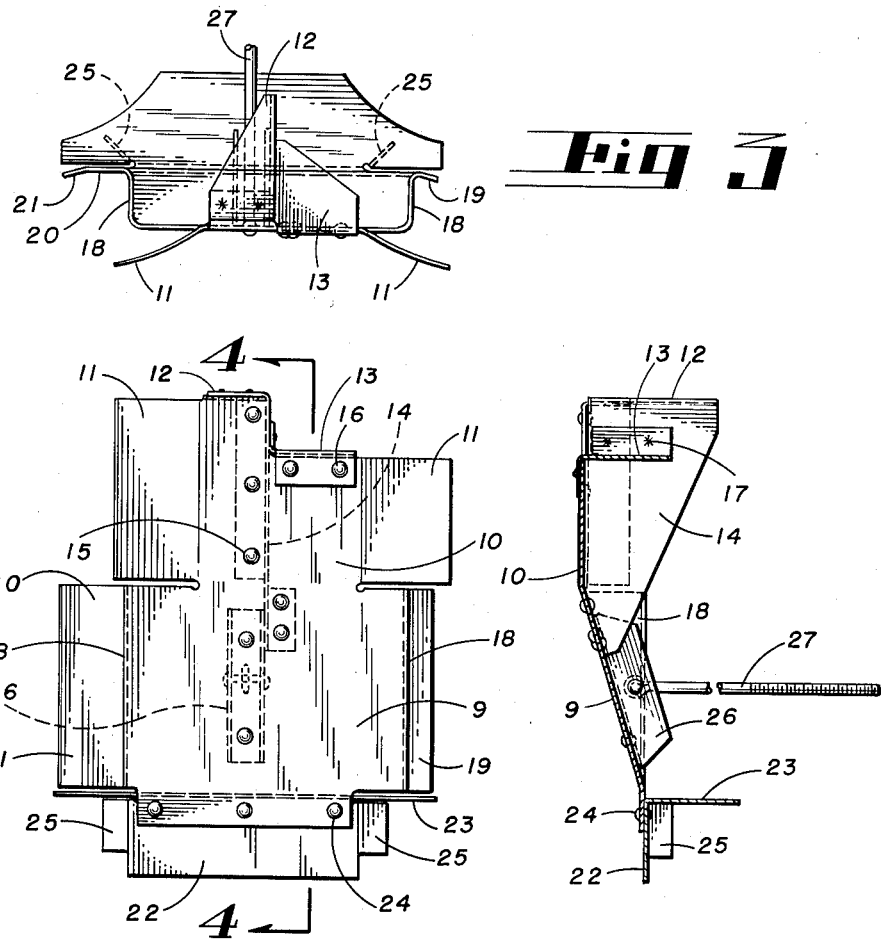

Jan. 3, 1956  F. G. ROHM  2,729,201
CYLINDER BAFFLE FOR AIR-COOLED ENGINE
Filed Oct. 28, 1954  4 Sheets-Sheet 3

INVENTOR.
FREDRIC G. ROHM.
BY Alden D. Redfield
Warren Kunz,
ATTORNEYS.

United States Patent Office 2,729,201
Patented Jan. 3, 1956

2,729,201

CYLINDER BAFFLE FOR AIR-COOLED ENGINE

Fredric G. Rohm, Montoursville, Pa., assignor to Avco Manufacturing Corporation, Cincinnati, Ohio, a corporation of Delaware Application October 28, 1954, Serial No. 465,249

9 Claims. (Cl. 123—41.6)

The present invention concerns an improvement for air-cooled engines and relates more particularly to a new form of baffle for directing cooling air adjacent the cylinder assemblies of such an engine.

Briefly described, the preferred embodiment of the invention comprises a rigid sheet metal baffle positioned between adjacent cylinder assemblies of an air-cooled engine which, for purposes of illustration, is shown as an opposed cylinder engine. It should be recognized, however, that the principles of the invention may be applied to other types of engines, such as radial engines.

Each of the cylinder assemblies (hereinafter called "cylinders") with which the novel baffle finds particular utility, comprises a finned, cylindrical lower portion, called the cylinder barrel, joined integrally with an upper portion, called the head. As will be appreciated by those skilled in the art, the barrel and head both dissipate large amounts of heat generated during engine operation, but the head normally runs at a higher temperature because it surrounds the combustion chamber of the cylinder.

The baffle of the present invention prevents a through flow of air directly between the cylinder barrels, and conducts a portion of the airflow from adjacent the barrels towards the heads of the cylinders. Cooling air also flows directly between the heads and joins the supplementary air from the barrels in spaces defined by the baffle and the adjacent heads. The converging streams of air develop intense turbulence in these spaces, causing re-circulation of the air over the hot cylinder head surfaces. The turbulent air effectively and uniformly cools the cylinder heads before escaping through flow channels defined by the cylinder head cooling fins and the baffle.

In view of the foregoing, it will be understood that a principal object of the present invention is the provision of an improved cylinder baffle. More specific objects comprise the following:

a. To provide a baffle which transfers air, passing between barrels of adjacent cylinders, to the cylinder heads to supplement the air flowing directly between the heads;

b. To provide a baffle which creates a mass of swirling turbulent air, which is conducive to rapid and uniform cylinder cooling;

c. To provide a baffle making possible effective cylinder cooling with a minimum cooling air pressure drop across the cylinders;

d. To provide a baffle which promotes superior engine performance through improved cylinder cooling.

The novel features which are considered characteristic of this invention are set forth in the appended claims; the invention itself, however, both as to its organization and operation, together with additional objects and advantages thereof, will best be understood from the following description of a specific embodiment when read in conjunction with the accompanying drawings, in which:

Figure 2 is an elevational view of the baffle separate from the cylinders;

Figure 3 is a top plan view of the baffle;

Figure 4 is a vertical sectional view of the baffle taken on plane 4—4 of Figure 2;

Figure 1:
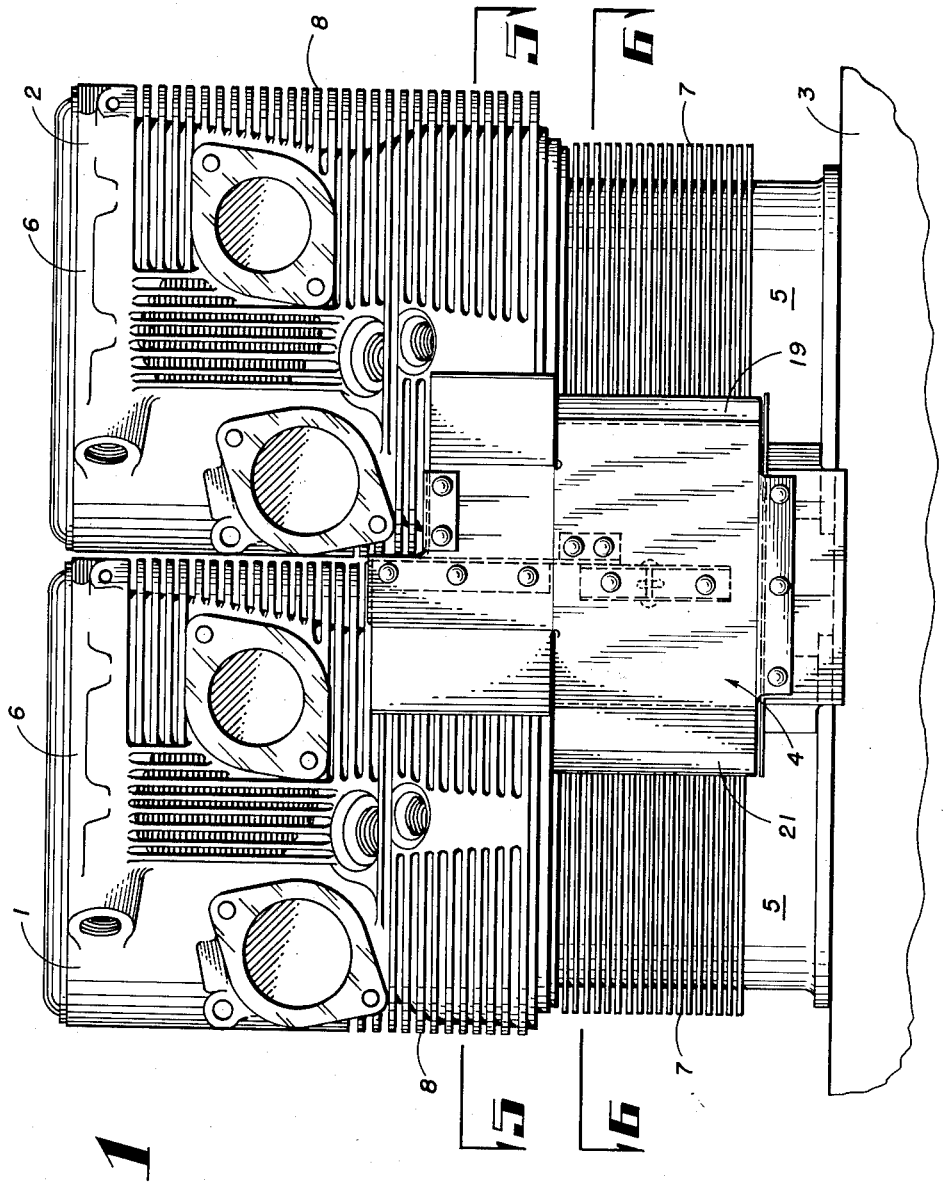
Figure 1 is an elevational view of adjacent cylinders with the cooling baffle attached to the outlet side from which the cooling air emerges from the cylinders.

Directing attention to Figure 1, a pair of juxtaposed air-cooled engine cylinders 1 and 2 are shown assembled with a crank case, a portion of which is shown at 3.

Indicated generally at 4 is the novel baffle of this invention, the baffle being secured, as will be explained later, to the outlet side of the cylinders from which the cooling air emerges. The source of cooling air is of no importance to the present invention and may be derived from a fan, as in some helicopter installations, or established by the ram effect incidental to forward motion of the aircraft with which the engine is associated.

Each cylinder assembly incorporates a barrel 5, within which a piston (not shown) reciprocates, and a head 6 surrounding a combustion chamber, as is well-known. Each barrel 5 has a plurality of closely spaced annular heat dissipating fins 7, while each head 6 incorporates a plurality of irregularly shaped fins 8. The cylinders are cooled through movement of cooling air over the fins 7 and 8 under the guidance of baffle 4, as will presently be explained.

The baffle is best illustrated in Figures 2 through 4 from which it will be noted that a major part of the baffle is formed from a single piece of sheet metal. The central portion of the baffle defines a tapered transfer channel 9 which directs airflow, passing directly between the barrels, up towards the cylinder heads. The transfer channel blends integrally into a planar area 10 which may be termed the "head plate" since it is positioned close to the heads of the cylinders. This plate is bounded at its sides by control portions 11 which lie immediately adjacent the fins of the cylinder heads, as illustrated particularly well in Figure 5. Extending perpendicularly from the upper part of the head plate are triangular top members 12 and 13 which block off the space between the cylinders, as can be understood from Figure 7. A divider 14 extends from the top members 12 and 13 down to the upper part of the transfer channel 9. This divider splits the airflow coming between the cylinders and apportions it evenly to each of the cylinders.

As illustrated in Figures 2 through 4, top member 12 may be formed integrally with divider 14 and riveted to the head plate of the baffle, as by rivets 15. Top member 13 may be separately formed and secured to the head plate 10 and divider 14 by rivets 16 and spot welds 17, respectively.

Figure 6:
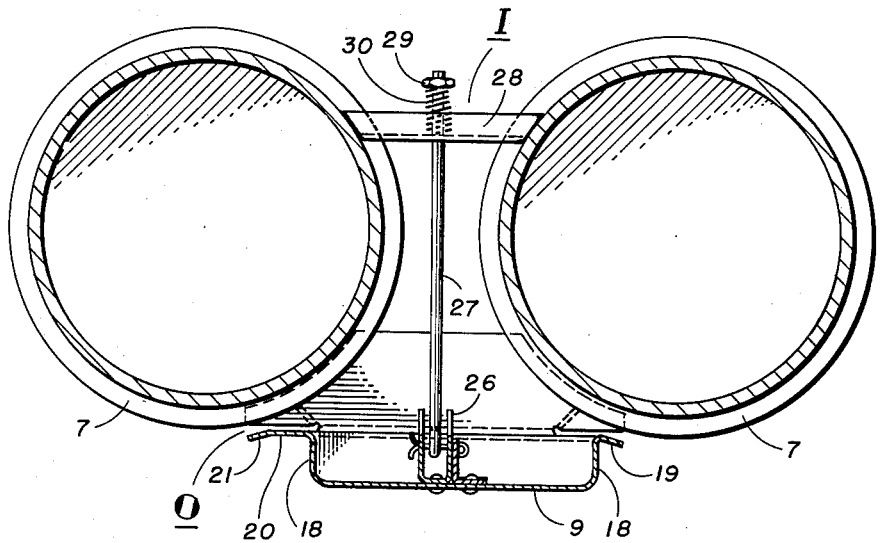
Figure 6 is a horizontal sectional view taken on plane 6—6 of Figure 1 showing the cylinder barrels and baffle in cross section.

Attention should now be directed to the details of the transfer channel. As illustrated in Figures 2 through 4, the transfer channel includes integral triangular side pieces 18 joined at one side of the baffle to an integral control portion 19 and at the other side of the baffle to a planar area 20 which terminates in a control portion 21. As illustrated in Figures 1 and 6, the control portions 19 and 21 lie closely adjacent the fins of the cylinder barrels and regulate the flow of air between the barrels and through the fins.

Returning to Figures 2 through 4, a base plate 22 and horizontal divider 23 are riveted, as at 24, to the bottom of the transfer channel. The base plate projects down to and engages the crank case, as illustrated in Figure 1, and extends laterally, as at 25, into engagement with the bases of the cylinder barrels 5 thereby preventing passage of cooling air through this region and avoiding loss of pressure drop across the cylinders.

Figure 7:
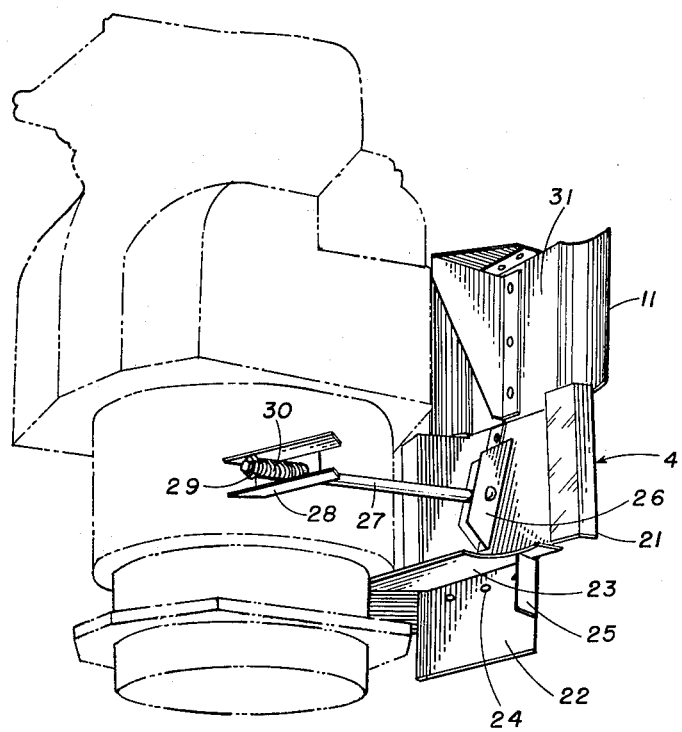
Figure 7 is a perspective view of a cylinder and baffle in assembled relationship, the cylinder being shown in phantom lines to simplify the illustration.

The baffle is secured to the cylinders by conventional means. As shown in Figures 6 and 7, a channel 26, secured to the interior of transfer channel 9, pivotally supports a threaded rod 27 which extends between the cylinder assemblies and through a transverse channel 28. A nut 29 and spring 30 engage rod 27 and, with the aid of channel 28, clamp the baffle to the adjacent cylinders.

Any other means may be employed as desired to secure the baffle to the cylinders.

Figure 5:
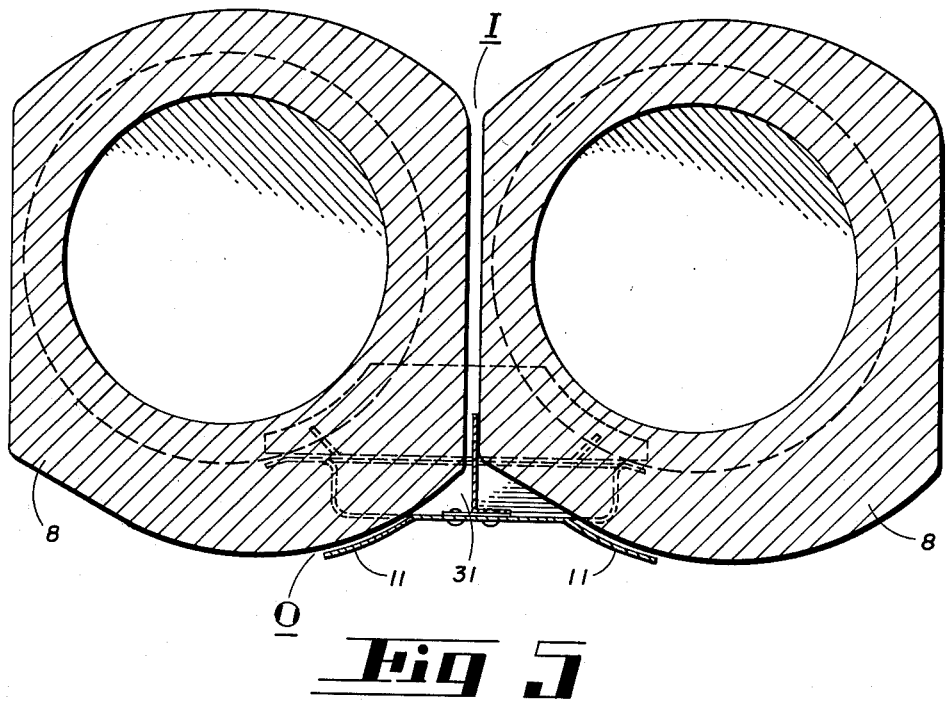
Figure 5 is a horizontal sectional view taken on plane 5—5 of Figure 1 showing the cylinder heads and baffle in cross section.

The function of the baffle may now be considered. As shown in Figures 5 and 6, the inlet sides of the cylinders have been designated "I," whereas the outlet side has been designated by the letter "O." A portion of the cooling air from the inlet side flows between the cylinder barrels. Of this air, a part flows directly along the barrel fins, past the control portions 19 and 21 to the outlet side, thereby cooling the cylinder barrels effectively.

Another part of the cooling air, passing between the barrels, is directed by the transfer channel 9 upwardly into spaces 31 defined by top members 12 and 13, divider 14, and head plate 10. Here the cooling air, supplemented by additional air flowing directly to spaces 31, from between the cylinder heads, becomes violently turbulent and re-circulates repeatedly against the fins of the cylinder heads. The swirling air eventually flows between the head fins and past the control portions 11 of the baffle to the outlet side of the cylinders.

It will be noted that the transfer channel 9 is tapered, increasing in cross sectional flow area to accommodate increasing volumes of cooling air which join in flowing toward the cylinder heads.

By virtue of the re-circulation of air in volumes 31, remarkably uniform cooling of the cylinder heads can be attained. In conventional installations, temperature differentials of 35 to 50° F. have been encountered on opposite sides of the heads. By use of the present baffle, however, substantially uniform temperatures can be established at corresponding points on opposite sides of the heads.

Increased cooling also results from the re-circulation of air against the cylinders. To illustrate, by using my improved baffle, it is possible to cool an engine satisfactorily with a cooling air pressure drop of four inches of water across the cylinders whereas in comparable engines operated under comparable conditions a seven inch water pressure drop was required, using conventional baffles.

It will be noted that the baffle does not extend for the full length of the cylinders since the upper portions of the cylinder heads are not completely finned and serve as baffles for the immediate adjacent heads. Further, the upper portions of the heads merely accommodate the valve mechanism and are not required to dissipate as much heat as the lower portions of the heads which are closer to the combustion chambers.

It will be appreciated that uniform cylinder cooling minimizes thermal deformation and reduces engine wear. Increased cooling, which also results from use of the present baffle, improves over-all engine operation, making the baffle a very desirable addition in an engine installation. Actual tests have demonstrated the marked superiority of my baffle disclosed in this specification.

Having described a preferred embodiment of my invention, it is my intention to claim the invention disclosed as broadly as justified by the prior art.

I claim:

1. A baffle for an air-cooled engine having juxtaposed cylinders each of which includes a lower finned barrel portion and an upper finned head portion over which cooling air flows in passing from one side of the cylinders, termed the "inlet side," to the other side of the cylinders, termed the "outlet side," comprising an upwardly tapered transfer channel closely adjacent the outlet side of the juxtaposed barrel portions, control portions laterally disposed on said transfer channel located closely adjacent the fins of the barrel portions, a head plate immediately above said transfer channel and adjacent the cylinder heads, lateral control portions integral with said head plate closely adjacent the fins of the cylinder heads, a top member at the top of said head plate disposed in the space between the adjacent cylinder heads, and a base plate below said transfer channel for blocking airflow past the bottom portions of the cylinder barrels, whereby air flowing from the inlet to the outlet sides between the cylinder barrels passes in part between the fins of the barrels and past the first-mentioned control portions, a part of the air being deflected and conducted by said transfer channel to the space defined by said head plate and said top member, where the air is joined by supplementary air flowing directly between the cylinder heads, all of the air adjacent the head plate flowing past the head fins and said second-mentioned control portions.

2. A cooling air baffle for use with a pair of juxtaposed air-cooled engine cylinders each comprising a lower finned barrel portion and an upper finned head portion comprising a transfer channel adjacent the juxtaposed barrel portions, a head plate integrally connected with said transfer channel adjacent the juxtaposed head portions, and a top member at the top of said head plate projecting into the space between the juxtaposed head portions, whereby cooling air flowing between the barrel portions is partially diverted by said transfer channel up to said head plate adjacent said top member where it is joined by supplementary air flowing directly between the head portions.

3. A baffle for use with air-cooled engine cylinders comprising a tapered transfer channel, a head plate at the upper end of said channel, a top member projecting perpendicularly from the upper end of said head plate, control portions projecting laterally from the sides of said transfer channel and said head plate, a vertical divider projecting perpendicularly from said head plate, a base plate at the bottom of said channel, and a horizontal divider projecting perpendicularly from the upper portion of said base plate.

4. A cooling air baffle for use with air-cooled juxtaposed engine cylinders each of which includes a finned barrel portion and a finned head portion over which cooling air flows comprising an upwardly tapered transfer channel secured adjacent the juxtaposed barrels, a head plate above said channel immediately adjacent the juxtaposed heads, a top member projecting towards the heads from the top of said head plate, control portions extending laterally from said channel and said head plate towards the adjacent fins of the barrel and head portions respectively, and a divider projecting from said head plate towards the space between the juxtaposed cylinders whereby cooling air flowing between the cylinders passes between the fins of the barrel and head portions and said control portions, a part of the air flowing between the barrel portions being conducted by said transfer channel up to the region of said head plate and top member where it is supplemented by air flowing directly between the heads, said divider splitting the stream of air to establish independent swirling masses of turbulent air adjacent the head portions which air eventually flows past the head fins and adjacent control portions of said head plate.

5. A unitary cooling air baffle for use between a pair of juxtaposed air-cooled engine cylinders each comprising a lower finned portion and an upper finned portion comprising air transfer and control means adjacent the lower finned portions for controlling movement of air between the lower finned portions and for directing air substantially parallel to the cylinder axes to the upper finned portions and an air-control and deflecting means made integral with said first-named means and located adjacent the upper finned portions for receiving air from said air transfer means and air flowing between the upper finned portions whereby cooling air flows between the lower finned portions and is conveyed to the region of said second means where thhe cooling air is joined by supplementary air passing directly between the upper finned portions to establish a swirling mass of turbulent cooling air adjacent the upper finned portions.

6. A unitary cooling air baffle for use between air-cooled juxtaposed engine cylinders each of which includes finned upper and lower portions over which cooling air flows comprising upwardly tapered air transfer means secured adjacent the lower cylinder portions for controlling movement of air between the lower finned portions and for directing air substantially parallel to the cylinder axes to the upper finned portions, and air receiving and control means joined integrally with said first-mentioned means defining confined air spaces adjacent the upper cylinder portions for receiving air from said air transfer means and air flowing between the upper finned portions whereby cooling air flowing between the fins of the lower cylinder portions is partially deflected and conveyed by said first means to said second means where it is joined by cooling air flowing directly between the upper cylinder portions, the cooling air circulating turbulently in the confined spaces adjacent the upper cylinder portions before passing between said second means and the fins of the upper cylinder portions.

7. Apparatus as defined in claim 6 including control portions laterally disposed on said first-mentioned means for directing airflow between the fins of the lower cylinder portions.

8. A unitary cooling air baffle for use with a pair of juxtaposed air-cooled engine cylinders each comprising a lower finned barrel portion and an upper finned head portion comprising a tapered transfer channel adjacent the juxtaposed barrel portions, a head plate connected with said transfer channel adjacent the juxtaposed head portions, a member at the top of said head plate projecting into the space between the juxtaposed head portions, and means pivotally connected to said transfer channel extending between said barrel portions for holding the baffle closely adjacent the cylinders.

9. A unitary cooling air baffle for use between a pair of juxtaposed air-cooled engine cylinders each comprising a lower finned barrel portion and an upper finned head portion comprising an upwardly tapered transfer channel adjacent and spanning the space between the juxtaposed barrel portions, a head plate connected to said transfer channel adjacent the juxtaposed head portions, means at the top of said head plate for sealing the space between the juxtaposed head portions, and control portions associated with said transfer channel and said head plate for directing air between the fins of the barrel portions and head portions, respectively.

References Cited in the file of this patent
UNITED STATES PATENTS

| Number | Name | Date |
|---|---|---|
| 1,997,173 | Gosslau et al. | Apr. 9, 1935 |
| 2,057,010 | Chilton | Oct. 13, 1936 |
| 2,467,992 | Riple, Jr. | Apr. 19, 1949 |